J. E. RICE.
CORN HARVESTER.

No. 103,779. Patented May 31, 1870.

United States Patent Office.

JACOB E. RICE, OF MOLINE, ASSIGNOR TO HIMSELF AND ARCHIBALD A. RICE, OF CHICAGO, ILLINOIS.

Letters Patent No. 103,779, dated May 31, 1870.

IMPROVEMENT IN CORN-HARVESTER.

The Schedule referred to in these Letters Patent and making part of the same.

I, JACOB E. RICE, of Moline, in the county of Rock Island and State of Illinois, have invented certain Improvements in Corn-harvesting Machines, of which the following is a specification.

Nature and Objects of the Invention.

The nature of my invention relates to an improvement in corn-harvesters of that class intended to pick the ears from the stalks in the field; and The invention consists—

First, in the combination of a rotary picker and reel, in such a manner that, while the stalks and ears are held by the picker, the ears will be knocked off of the stalks and swept into the box placed to receive them.

Secondly, it consists of the arrangement of a guard to prevent stalks coming in contact with the reel.

Description of the Accompanying Drawing.

Figure 1:
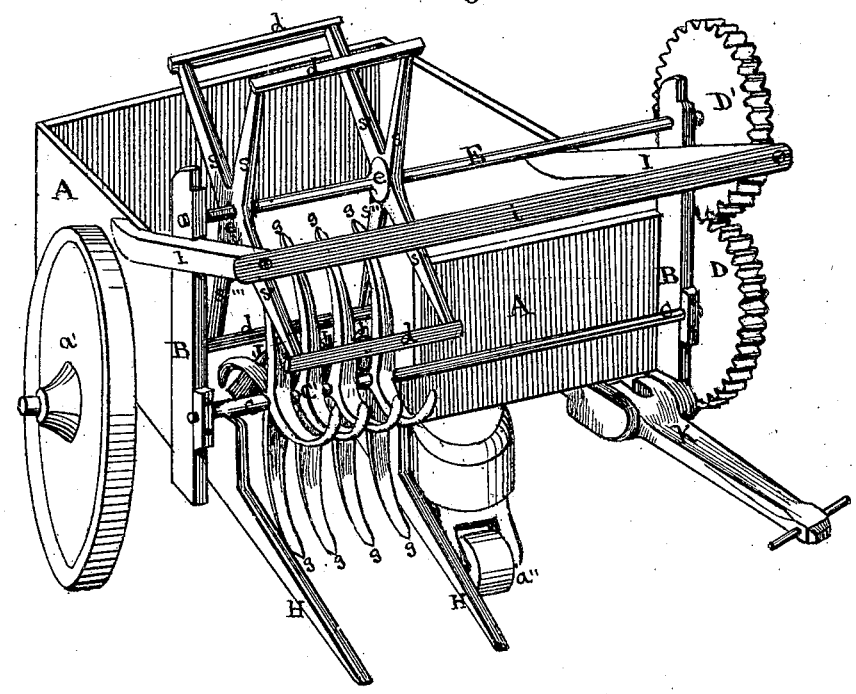
Figure 1 is a perspective view of a machine embodying my invention.
Figure 2:
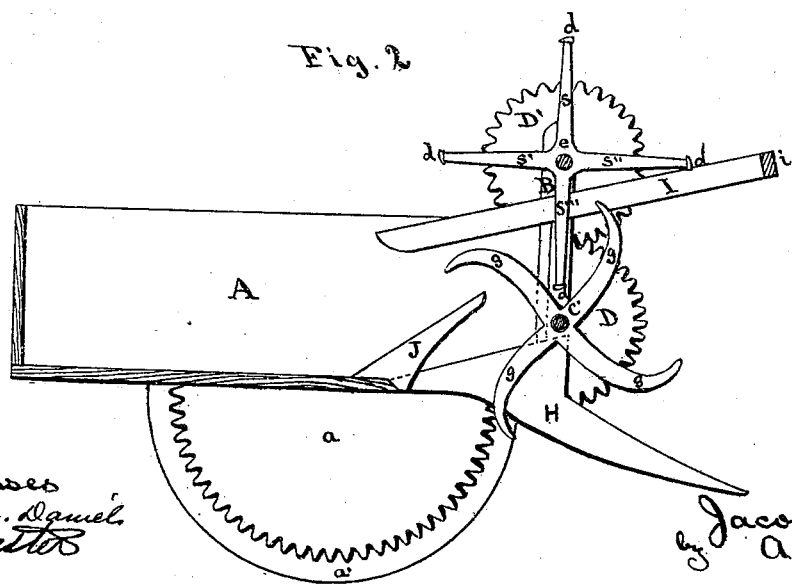
Figure 2 is a vertical sectional view of fig. 1.

General Description.

A is a box for supporting the main parts of my invention, and is itself supported on the wheels $a'\ a'$ Additional wheels may be pivoted beneath the box A for balancing the same, as shown by $a''$ B B are uprights, attached to the forward end of the box A.

C is a shaft extending across the forward end of the box A, and having suitable bearings at each end, either in the box A or uprights B B, and carries on one end the pinion D, gearing with the drive-wheel $a$, from which it receives motion.

E is a countershaft to C, and is supported in suitable bearings on the uprights B B, and carries on its end the pinion D' gearing with the pinion D, with which it corresponds in size and number of cogs, and from which it receives motion.

Attached to the shaft C, and rotating with it, is the picker C', consisting of four different series of radial, curved, and pointed arms $g\ g\ g\ g\ g\ g$, which may have any desired form in their cross-sections, and may be either wrought or cast-iron, or any other suitable material.

Attached to and rotating with the shaft E is a reel, $e$, with four pairs of arms $s\ s,\ s'\ s',\ s''\ s'',$ and $s'''\ s'''$, each pair connected by a bar, $d\ d\ d\ d;$ and the reel is placed in such relative position to the picker $g$ that, when they are in motion, the bars $d$ will sweep the upper side of each series of arms $g$ of the picker.

H H are fingers or pointed bars, extending forward from the main frame or box, one on each side of the picker.

I I are arms, extending forward and upward, and carrying a cross-bar or guard, $i$, on their outer end.

J J J J are arms inside of the box A, and so situated that the picker-teeth $g\ g\ g$ pass between them when in operation.

K is the draft-pole.

The operation is as follows:

The machine is drawn forward with the picker in line with the row of corn to be picked. The arms H H will raise the stalks that are inclined to either side, and all will thus be brought in position to be caught between the fingers of the picker, when the bars $d$ will, in sweeping round, knock or pull the ears from the stalks, and sweep them along backward and into the box A, the guard $i$ serving to keep the tops from striking the reel, and the arms J serving to keep the picker clean.

A duplicate of the picker and reel may be placed on the same shaft, for picking two rows at a time.

The cross-bars $d$ on the reel may also be made adjustable, if desired, and they may be made either sharp or blunt on their striking-edge, and of any suitable material.

Claims.

I claim as my invention—

1. The combination of the interlocking reel $e$ and picker C', when arranged to operate in conjunction, substantially in the manner described, and for the purpose specified.

2. The combination of the guard I I $i$ with the reel $e$ and picker C', substantially as described, and for the purpose specified.

3. The combination and arrangement of the box A, fingers H H, picker C', reel $e$, guards I I $i$, arms J J J J, and tongue K, substantially as described, and for the purpose set forth.

4. The arrangement of the drive-wheel $a'$, pinions D D', shafts C and E, picker C', and reel $e$, substantially as described, and for the purpose specified.

JACOB E. RICE.

Witnesses:
CHR. N. LOBDELL,
C. F. HEMENWAY.